Aug. 13, 1940.   T. C. ANDREWS   2,211,310
MACHINE FOR SERIAL NUMBERING AND NOTCHING CARDS
Filed Feb. 16, 1939   9 Sheets-Sheet 1

INVENTOR.
THOMAS COLEMAN ANDREWS
BY Harry Lea Dodson
ATTORNEY.

Aug. 13, 1940.  T. C. ANDREWS  2,211,310
MACHINE FOR SERIAL NUMBERING AND NOTCHING CARDS
Filed Feb. 16, 1939  9 Sheets-Sheet 4

INVENTOR.
THOMAS COLEMAN ANDREWS
BY Harry Lea Dodson
ATTORNEY.

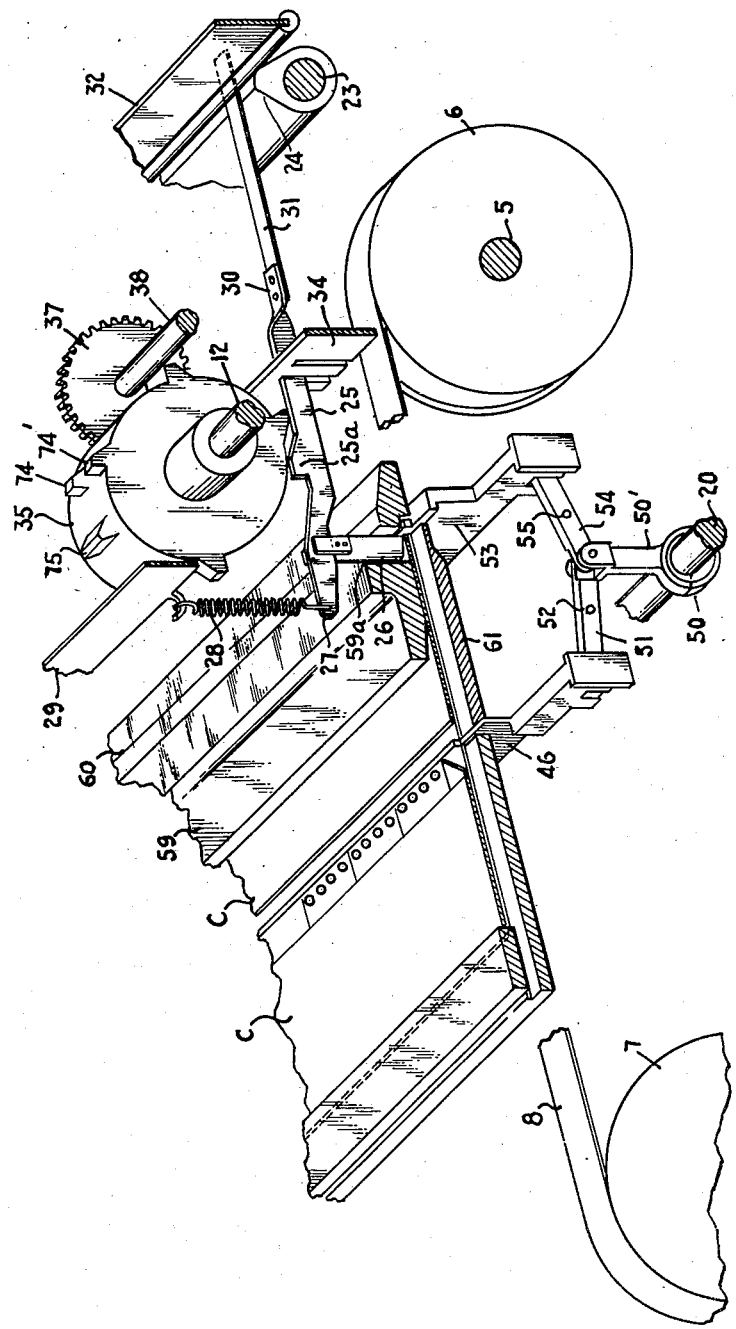

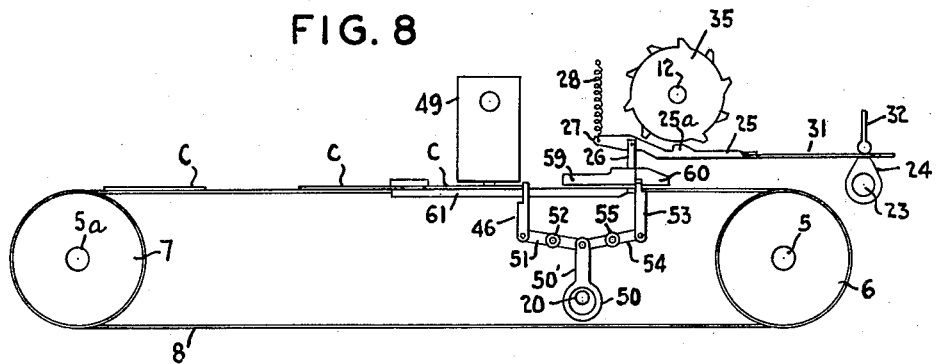
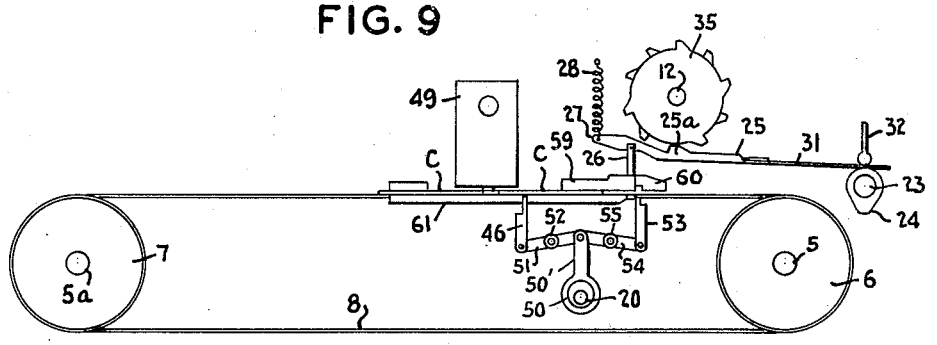
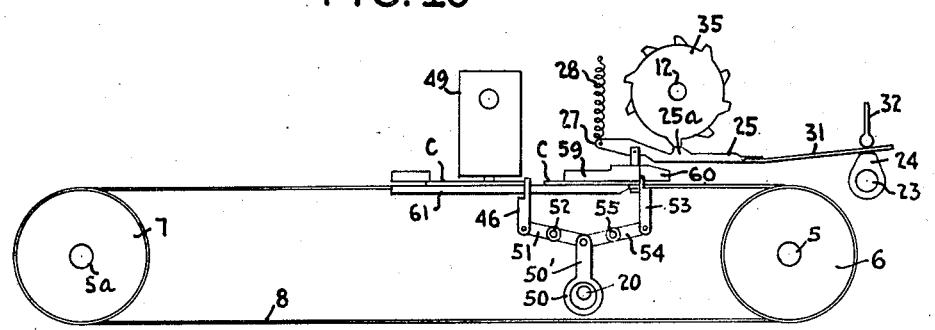

Aug. 13, 1940.   T. C. ANDREWS   2,211,310
MACHINE FOR SERIAL NUMBERING AND NOTCHING CARDS
Filed Feb. 16, 1939   9 Sheets-Sheet 7
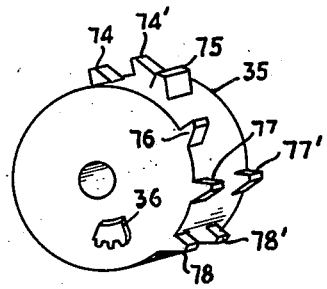
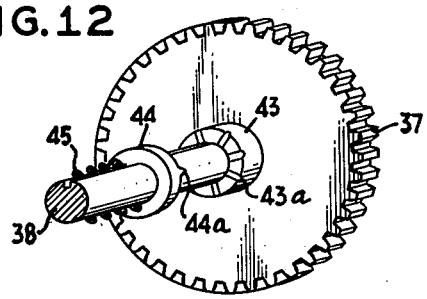
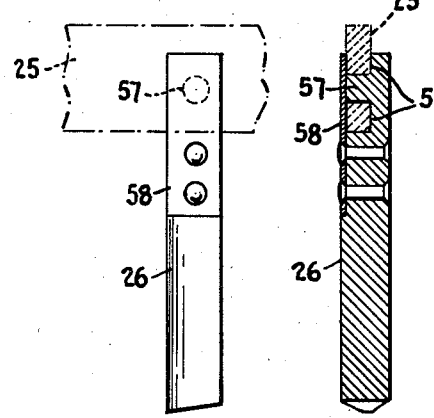
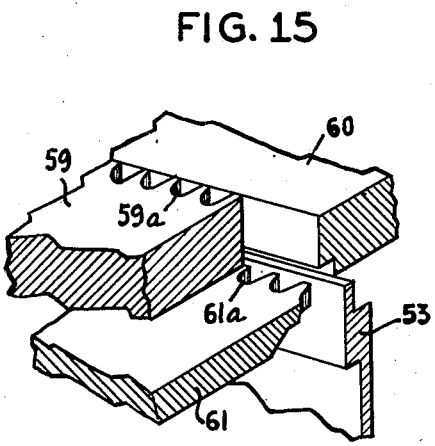
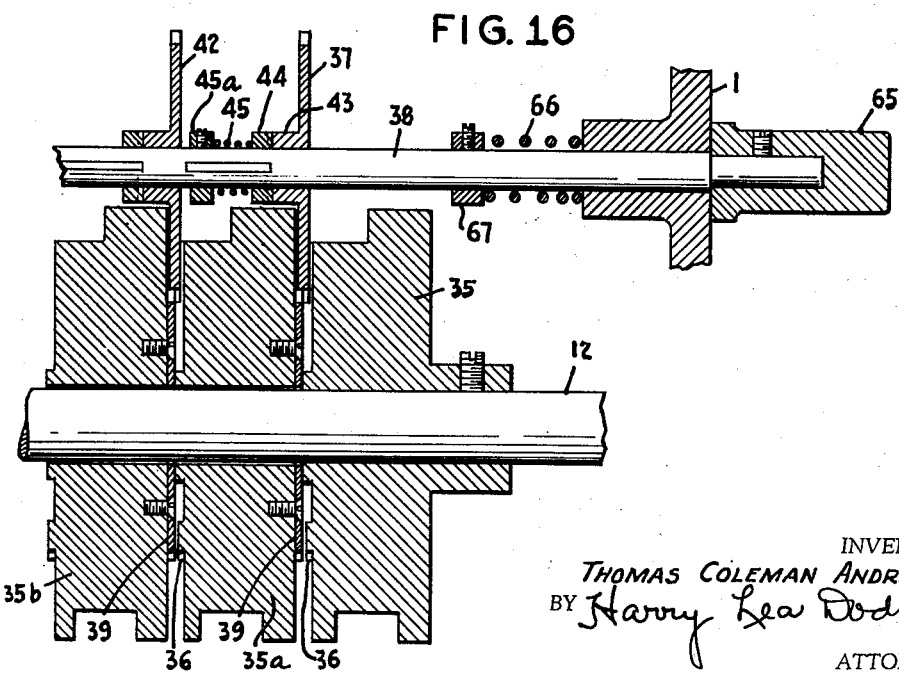
INVENTOR.
THOMAS COLEMAN ANDREWS
BY Harry Lea Dodson
ATTORNEY.

Aug. 13, 1940.  T. C. ANDREWS  2,211,310
MACHINE FOR SERIAL NUMBERING AND NOTCHING CARDS
Filed Feb. 16, 1939  9 Sheets-Sheet 8

INVENTOR.
*Thomas Coleman Andrews*
BY Harry Lea Dodson
ATTORNEY.

Aug. 13, 1940.   T. C. ANDREWS   2,211,310
MACHINE FOR SERIAL NUMBERING AND NOTCHING CARDS
Filed Feb. 16, 1939   9 Sheets-Sheet 9

INVENTOR.
THOMAS COLEMAN ANDREWS
BY Harry Lea Dodson
ATTORNEY.

Patented Aug. 13, 1940

2,211,310

UNITED STATES PATENT OFFICE 2,211,310

MACHINE FOR SERIAL NUMBERING AND NOTCHING CARDS

Thomas Coleman Andrews, Richmond, Va.

Application February 16, 1939, Serial No. 256,674

14 Claims. (Cl. 101—78)

My invention relates to a machine for automatically printing a number, notching same corresponding to the number printed on a card substantially the same as one known as a "Keysort" card, manufactured and sold by The McBee Company, of Athens, Ohio, under Perkins Patents No. 1,544,172 and No. 1,739,087, wherein cards of this type are punched with a series of holes for the purpose of facilitating sorting of the cards in numerical sequence. That portion of the card between the hole and the edge of the card is cut away or notched, as they say in the trade.

Cards of this type may have, for example, four holes punched in each subdivision which go to make up the units, tens, hundreds, tnousands, ten thousands, hundred thousands, etc. In each subdivision the four holes are known as 7421. The cards are then notched for one or more of these holes to make up the numerals from 1 to 9. As an example, in numbering from 1 to 9 starting with units, the hole 1 is notched for number 1; for number 2 the hole above 2; for number 3 the holes above 2 and 1, which added together give number 3; for number 4 the hole above 4; for number 5 the holes above 4 and 1, which added together give number 5; for number 6 the holes above 4 and 2, which added together give number 6; for number 7 the hole above 7; for number 8 the holes above 7 and 1, which added together give number 8; and for number 9 the holes above 7 and 2, which added together give number 9.

After completing the notching from 1 to 9 in the units division, the next division of tens may then be notched by repeating the operation, which notches, when taken in conjunction with the units division will give numbers from 10 to 99; and so in each higher division of numbers in conjunction with the preceding subdivisions, the resulting numbers will be 100 to 999, 1000 to 9999, 10,000 to 99,999, etc. Heretofore, cards of this type were perforated and printed and then manually notched by the user, the value of the entire system thus depending largely on the care and ability of the operator to perform this notching operation correctly.

My invention has for an object to produce a new form of card which will entirely avoid the danger of the tongues, which are left after the cards are notched, becoming torn or disarranged before the cards are to be sorted.

A further object of my invention is to provide a machine to automatically print and notch in proper relation and sequence, cards of the "Keysort" type.

A further object of my invention is to provide an individual cam unit for selecting in proper numerical sequence and combination a group of floating levers, each of which caries one of the punches used to notch the cards at the desired location. Each lever should have a resilient fulcrum point.

A still further object of my invention is to provide means for readily detaching a punch for repairs, etc., and reattaching the same without dismantling the machine.

A still further object of my invention is to provide locking means to prevent the freely mounted gearing from turning due to vibration, etc., which may arise in the machine.

With these objects in view, and others which will appear from the hereinafter contained description, the invention consists in certain novel features of construction and combination of parts, the essential elements of which are set forth in the appended claims.

My means of accomplishing the foregoing objects may be more fully comprehended by having reference to the accompanying drawings, which are hereunto annexed and are a part of this specification in which:

Fig. 7 is a perspective view showing the relative position of the parts which go to make up my device;

Figs. 8, 9, 10, are diagrammatic views showing the various steps in feeding, printing and notching of my device;

Fig. 11 is a detail view in perspective of the punch operating cam;

Fig. 12 is a detail view in perspective of the cam operating gear and its locking mechanism;

Figs. 31, 13 are enlarged detail views in side elevation and longitudinal cross section respectively of the quickly detachable punch;

Fig. 15 is a fragmentary view in perspective of the die blocks and card stop;

Fig. 16 is an enlarged cross sectional view of the punch operating cam and the cam driving gears;

Figure 1:
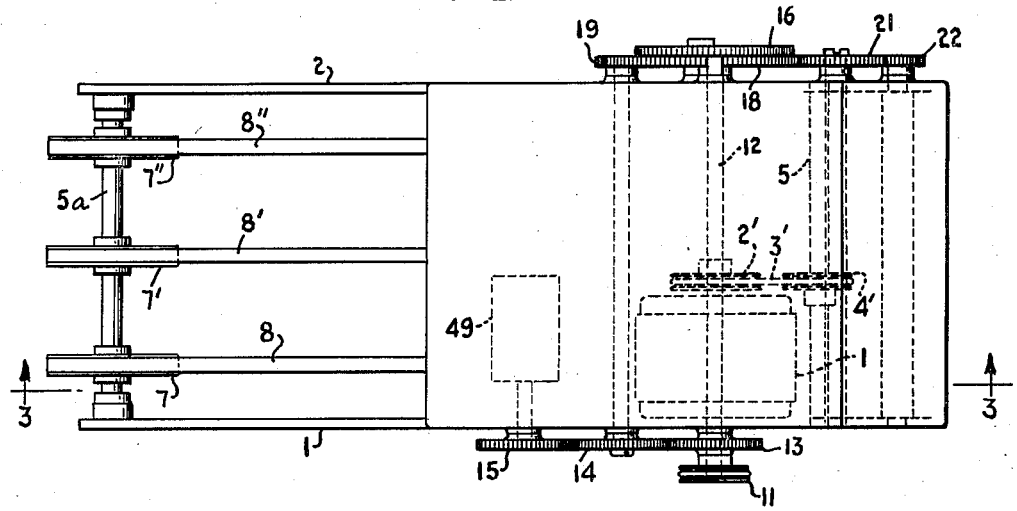
Fig. 1 is a plan view showing the driving, belt feed and gear train mechanism for operating my device.
Figure 2:
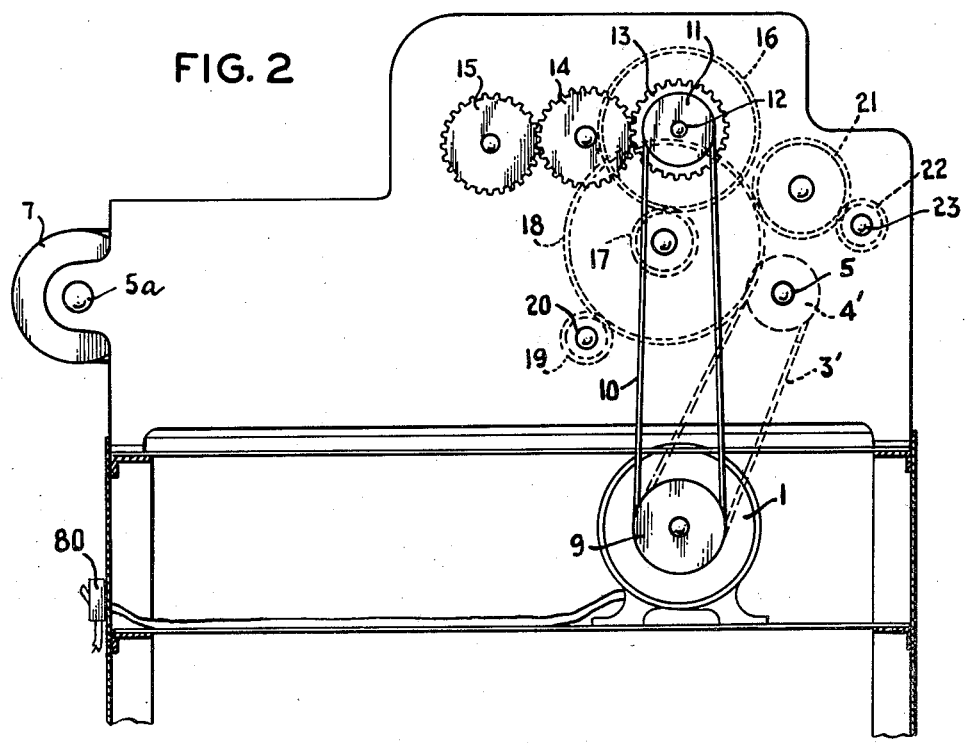
Fig. 2 is a similar view of Fig. 1 showing in side elevation the driving, belt feed and gear train mechanism for operating my device.

As shown in the drawings, my automatic numbering and notching machine is mounted in a casing consisting of right and left-hand side frames 1 and 2 which are secured rigidly together by two straps 3 and 4 which are secured to the frame by spot welding or in any other suitable or convenient manner. Several parts of the machine are also secured to the side frames furnishing additional strength. A suitable cover for the operating mechanism may also be provided, the cover can be formed to rest on a ledge in the side frames and may be fastened thereto.

The entire machine is portable and may be placed on a desk or table or may be stored when not in use. The mechanism is driven by an electric motor 1' preferably mounted under the machine although if desired, it may be mounted on a shelf (not shown) formed on one of the side frames. This motor 1' furnishes power for driving the machine in the preferred embodiment which is illustrated, although obviously other means may be employed, if desired.

*Feeding mechanism*

On one side of the motor 1' I mount a pulley 2' which is fixedly secured to the motor shaft and is connected by a belt 3' to a pulley 4'. The pulley 4' is mounted upon a drive shaft 5 which carries driving pulleys 6, 6', 6''. These pulleys in conjunction with pulleys 7, 7', 7'' on shaft 5a, drive three narrow belts 8, 8', 8''. These belts 8, 8', 8'' are the carrying means for feeding the cards C to be printed and notched, to the their various positions and delivering them into a suitable container (not shown) when the work has been completed.

Figure 3:
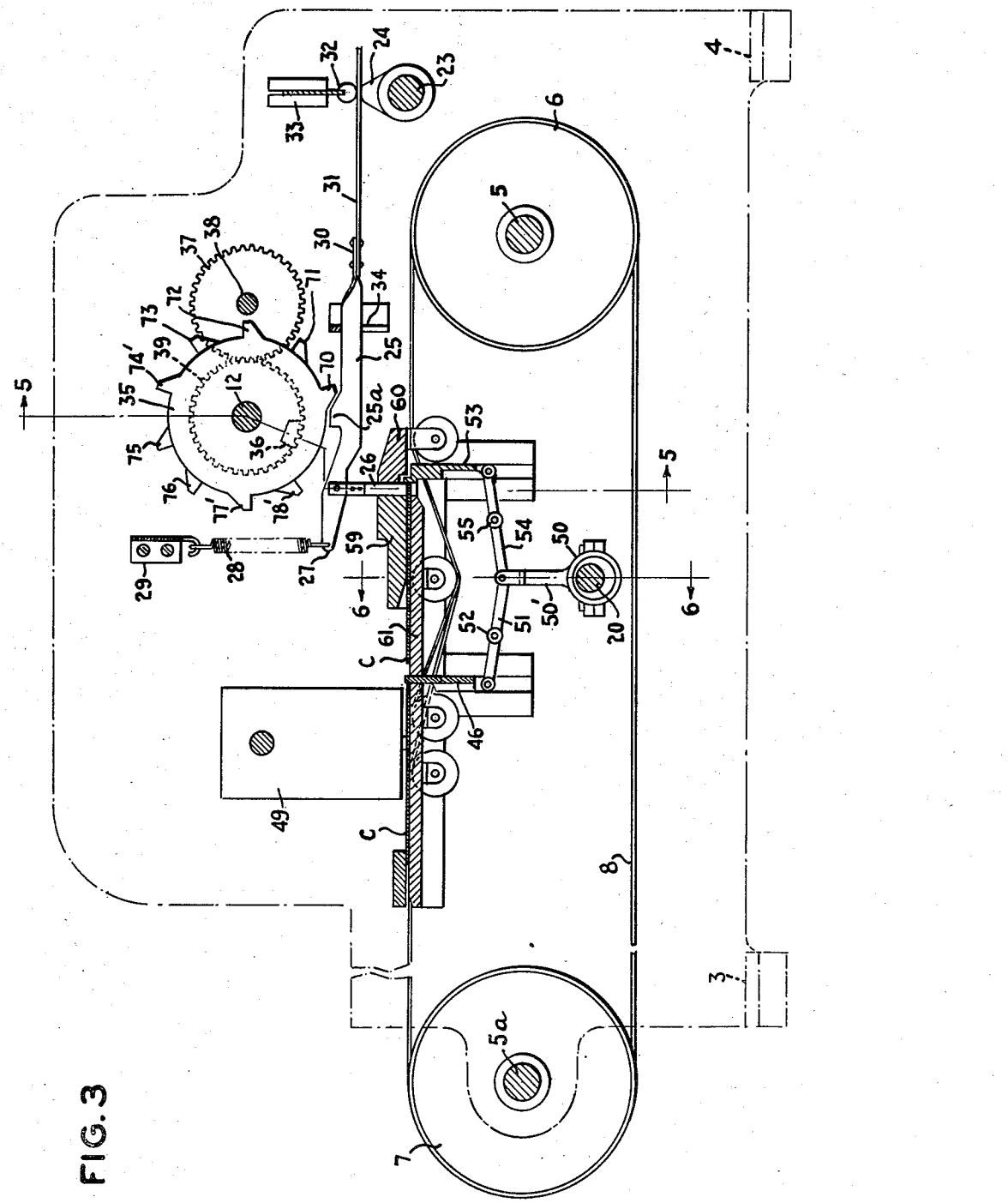
Fig. 3 is an enlarged longitudinal section on line 3—3 in Fig. 1 with the frame shown in dotted lines.
Figure 4:
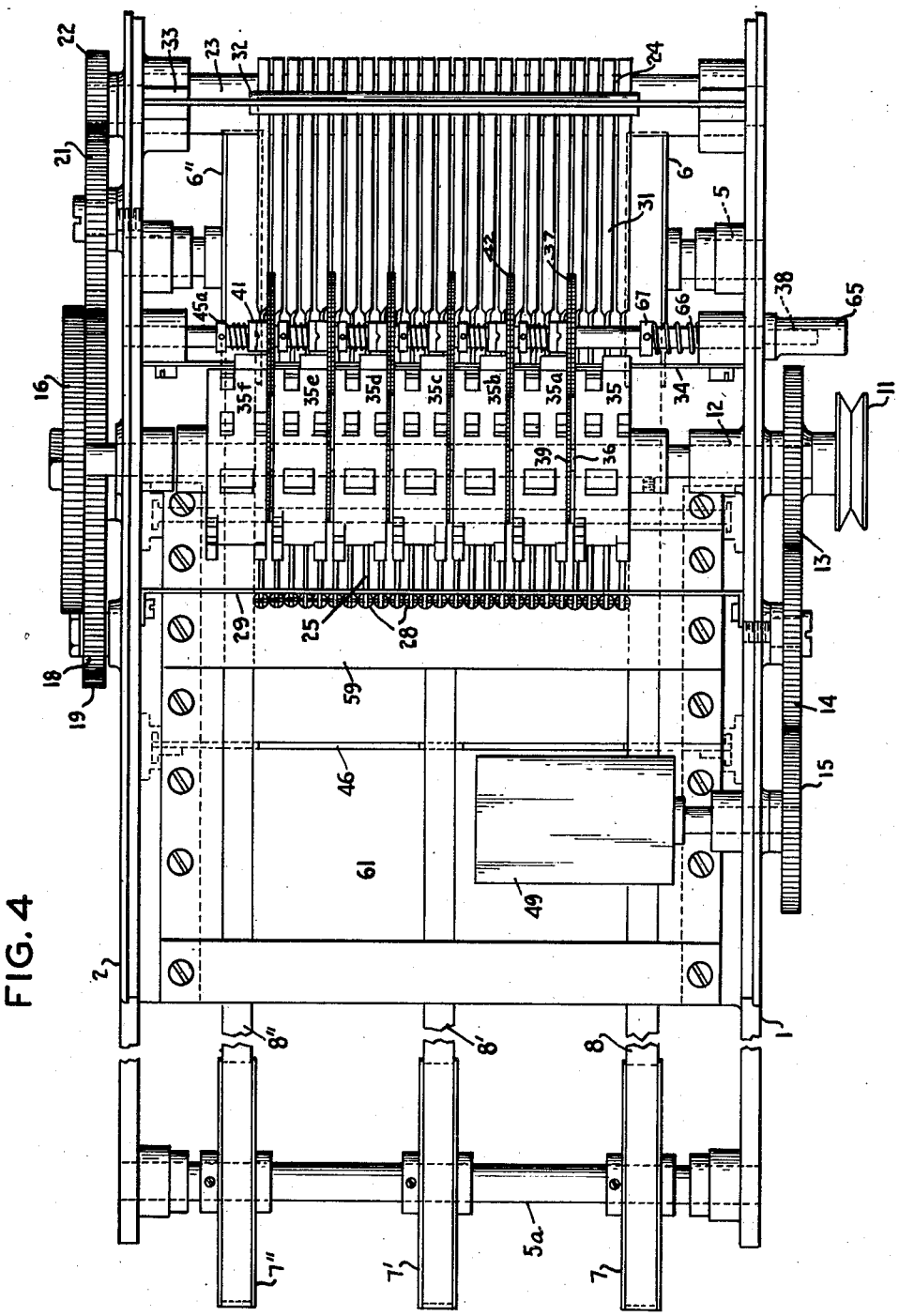
Fig. 4 is a plan view of my device with the cover removed.
Figure 17:
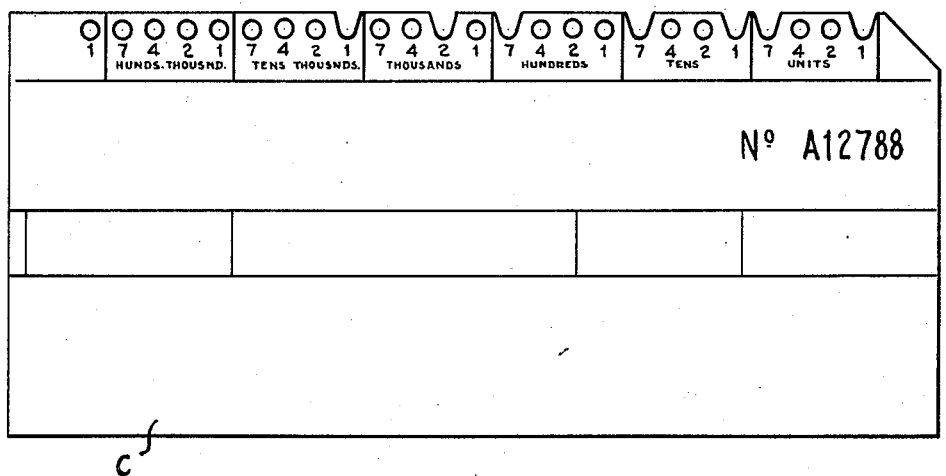
Fig. 17 is a view of my improved card ready to be sorted.
Figure 18:
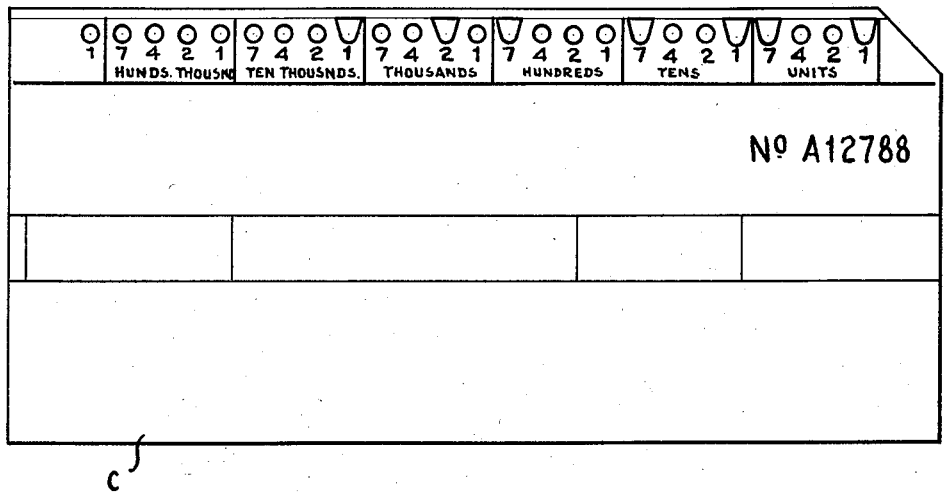
Fig. 18 is a detail view of my card notched but not yet prepared for sorting.

It has been found in practice when a comparatively thin sheet of paper is used, the tongues intermediate the notches, especially when the notches are close together, are liable to get folded over or torn off thus destroying to some degree, the accuracy of the sorting. I have found in practice that by making the cards as shown in Fig. 18 with the holes and notches entirely within the edge of the card and then prior to sorting them, cutting off the edge as shown in Fig. 17, such objection is entirely overcome. The belts 8, 8', 8'' are purposely made narrow so that when a card C is stopped for numbering or notching, the belts 8, 8', 8'' will slip underneath it, thus permitting the card C to remain stationary for the period of time required for the desired operation of numbering or notching to take place. Under some circumstances, it may be found that the pressure caused by the printing of the numbers on the cards or notching them, will interfere with the continuous movement of the belts 8, 8', and 8''. Under those circumstances, these belts 8, 8', and 8'' may be brought over and under idler rollers to permit continuous rotation, as clearly seen in Fig. 3. When this is done, obviously the portion of the die block adjacent the belts 8, 8' must be cut away. The belts 8', 8'' or 8 and 8'', will furnish sufficient frictional engagement to carry the card across the cut-away portion, when this occurs. Thus it will be seen that at all times there are two of the belts carrying the cards.

It is necessary to interrupt the feeding of the cards C at two locations; one for the operation of printing the number on the card; and two, for the operation of notching the card to correspond to the number which has been printed thereon. I accomplish this by means of the combination of two similar rotating eccentrics, straps, and rods, together with a plurality of pivoted levers connected to stops. The rotation of the eccentric 50 elevates the eccentric rod 50'. A lever 51 is pivotally fastened to the upper end of this rod. This lever 51 is fixedly pivoted, adjacent its central portion 52, to each side frame 1 and 2. The opposite end of the lever 51 is pivotally secured to a stop 46 so that the reciprocation of the eccentric rod 50' will cause the lever 51 to move up and down and this will move the stop 46 upwardly into the plane of travel of the cards C so that the card will abut it and be held from further forward movement until the number is printed on it. A similar stop 53 is arranged in position so that the card, when it abuts it, will register with the punches for the notching operation. This stop 53 is pivotally secured to one end of a lever 54, the rear end of the lever 54 is pivotally secured, as is the rear end of the lever 51, to the upper end of the eccentric rod 50'. Lever 54 is mounted on a fixed pivot 55 which is secured to each side frame 1 and 2. When the card has been numbered, the continued rotation of the eccentric 50 will move the stop 46 downwardly and out of the path of travel of the card C which will then be carried forward into position for the notching of the card. By this time the eccentric will have revolved so as to bring the stop 53 into the path of travel of the card C against which it will abut, the card is then held until the notching operation is performed at which time the continued rotation of the eccentric will move the stop 53 downwardly out of the path of travel of the card C which will be carried on and deposited in any suitable container (not shown) provided for it. It will be clear that the two stops are thus synchronized to move upwardly and downwardly in unison as the eccentric 50 is revolved. The movement of the stops are in timed relation to the numbering mechanism 49 which is operated by gear 15 of a train of gears 13, 14 and 15 which are driven by the shaft 12.

*The punching mechanism*

A pulley 9 is mounted on the motor shaft on the opposite side of the motor from the pulley 2. This pulley is connected by a belt or chain 10 to a pulley or sprocket 11 to drive a shaft 12 which carries the punch operating cam mechanism which will be hereinafter described.

On the right-hand side 1 of the frame and secured to shaft 12 is a gear 13 which meshes with an idler gear 14 which drives a gear 15. This train of gears is synchronized so as to keep in timed relation the printing and notching mechanisms with each other.

On the left-hand side 2 of the frame and secured to the shaft 12 is a gear 16 which meshes with a gear 17, which is one of a pair of gears 17 and 18. The other gear 18 of this pair is in mesh with a gear 19 which is secured to a shaft 20. This shaft 20 is the shaft upon which is mounted the eccentric 50 provided with a split strap and having an eccentric rod 50'. I provide a gear 21 which is also in mesh with the gear 18. This gear 21 is in mesh with a gear 22 which is secured to a shaft 23 which is preferably formed with a cam surface 24. The function of the cam is to raise the floating punch levers 25. These punch levers are arranged in groups of four adapted to register with the cam surfaces formed on the periphery of the punch actuating cams.

A punch 26 is carried by and secured to each punch lever 25 so that the movement upwardly brings a punch into proper position to be depressed by the cam surfaces on the punch operating cams which are mounted on the shaft 12. The punches 26 as more clearly seen in Figs. 13 and 14 are formed with a cut-out portion 56 and a raised boss 57, preferably formed integral with the punch. The front end of the punch lever 25 is provided with an opening which is fitted to and coincides with the raised boss 57 so that the movement of the lever will carry the punch with it. To prevent the lever 25 from coming off of this pivotal mounting and at the same time to provide for quickly detaching or securing the punch 26 to the lever 25, I provide a flat flexible spring 58. This spring which has sufficient tension to hold the end of the lever in place, may be secured by rivets or screws to the punch 26. At the forward end 27 of each of the levers 25, I provide a tension spring 28 which is secured to the end of the lever and exerts a tension to hold the lever 25 and its punch normally up so that the punch is out of the line of travel of the card C as shown in Figs. 7, 8, 9. The other end of the spring 28 is secured to a support 29 which is provided with a plurality of hooks as clearly seen in Fig. 7, to engage the springs. The ends of the support are fastened to the side frames 1 and 2. A flat spring 31 is secured to the rear end 30 of the lever 25 in any suitable manner. This flat spring 31 rides upon cam shaft 23 and is raised and lowered by the cam 24 as the shaft 23 revolves. The flat spring 31 is held constantly in contact with the surface of cam shaft 23 and cam 24 by means of a weighted bar 32 which is slidably mounted in guides 33 which are attached to the sides 1 and 2 of the frame. It will be clear that as the shaft 23 rotates the cam surface 24 will raise the lever 25 and its raised portion 25a up so that the latter will be in position to be engaged by the cam surfaces on the cam.

This cam shaft 23 is timed to revolve ten times to a single revolution of the punch operating cams, thus I allow for each one of the twelve cam surfaces on the punch operating cam to be brought into contact with the raised portion 25a of the levers 25, for each punching operation. It should be here noted that while the rear end 31 of lever 25 follows the surface of the cam shaft 23 as it revolves due to the weight of bar 32, the front end 27 of the lever 25 carries the punch 26 and is held up by the tension of the spring 28, thus providing room for the movement of the card that is to be punched to be carried by the belts 8, 8', 8'' into its proper position where it will abut the stop 53. As the cam is rotated the punch will be depressed by the cam surface on the cam engaging the raised portion 25a on the punch lever as clearly seen in Fig. 10, notching the cards while it is held from movement by the stop 53. This vertical movement of the punch being permitted by the yielding of the spring 28 which returns it to its normal position as soon as the card has been notched, at which time the cam surface will have moved out of engagement with the raised portion 25a of the punch lever, as shown in Fig. 8. In order to insure the correct alignment of the punch levers 25 in their vertical movement, I provide a comb 34 which serves to guide the levers when they are depressed by the action of the punch operating cams. The ends of the comb guide 34 are secured in any suitable or convenient manner to the side frames 1 and 2. I provide a suitable die block for the notching operation to be performed by the punches 26. These die blocks comprise a block 59 (Fig. 15) provided with slots 59a which act as guides for the punches 26. A second block 60 backs up the slots 59a to prevent the punches 26 from coming out of the guide slots 59a. Beneath these die blocks 59 and 60 I mount a cutting die block 61 with its cutting slots 61a corresponding to and in line with the guide slots 59a. These slots are also backed up by stop 53 in its raised position during the slotting operation. A tray or drawer (not shown) can be mounted under the cutting die block 61 to catch the cuttings from the cards if so desired.

Punch operating cams

Figure 5:
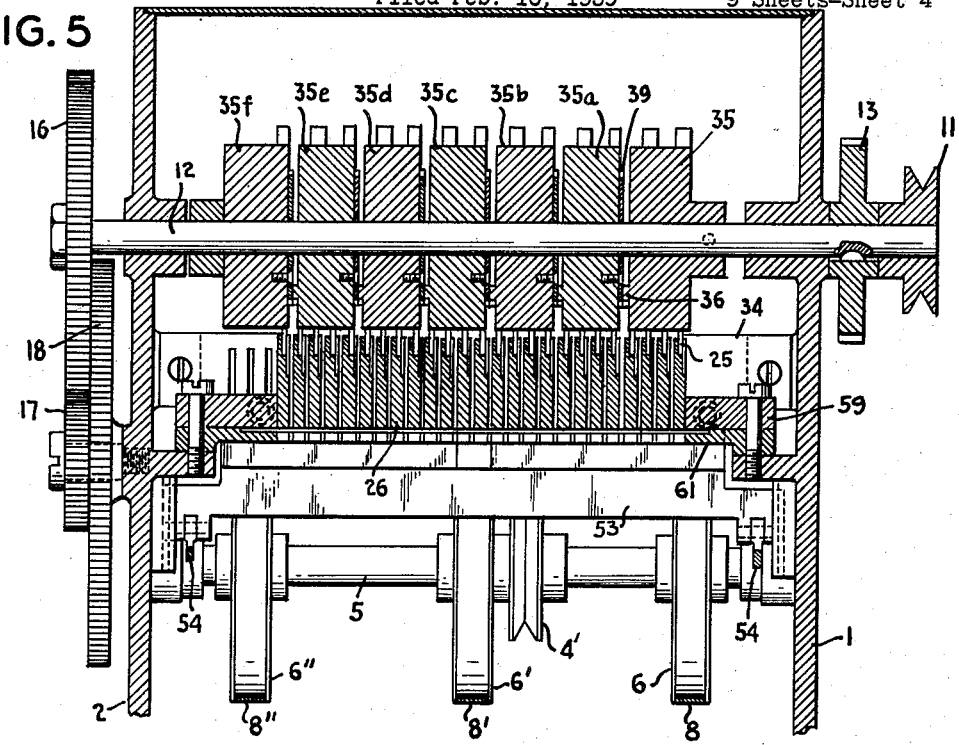
Fig. 5 is a cross sectional view showing the punches, punch operating cam, die blocks, card stop taken on line 5—5 in Fig. 3.
Figure 6:
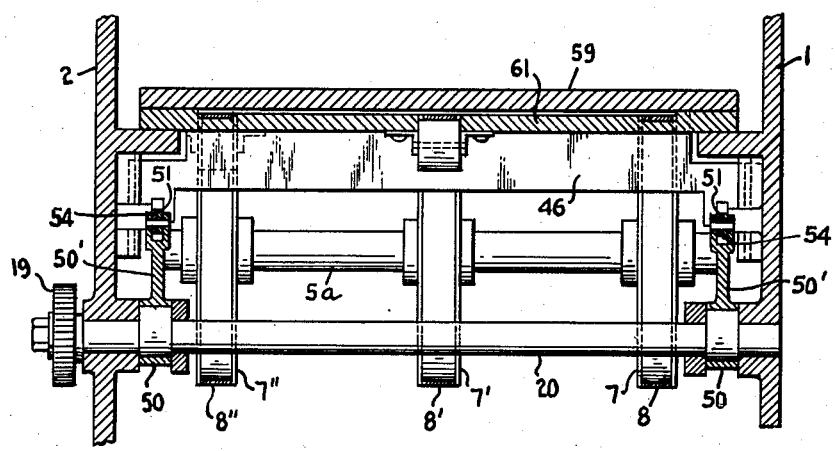
Fig. 6 is a cross sectional view showing the die block and card stop with its operating mechanism taken on line 6—6 in Fig. 3.
Figure 19:
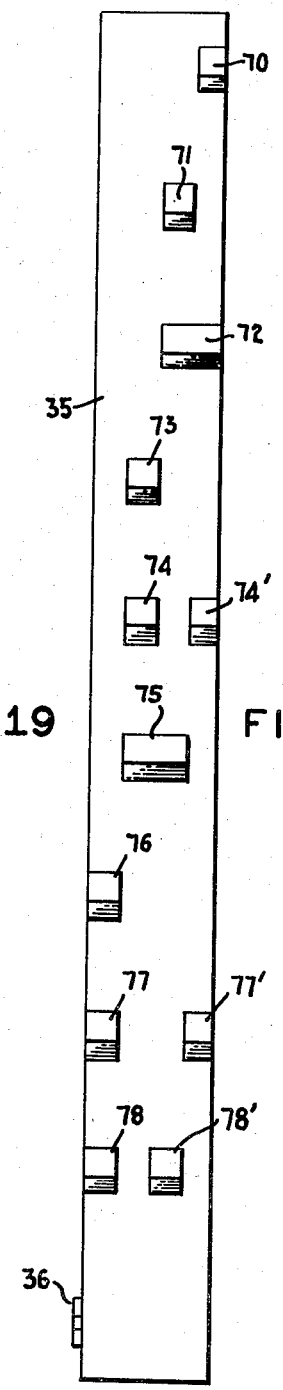
Fig. 19 is a developed view of one of the cams.
Figure 20:
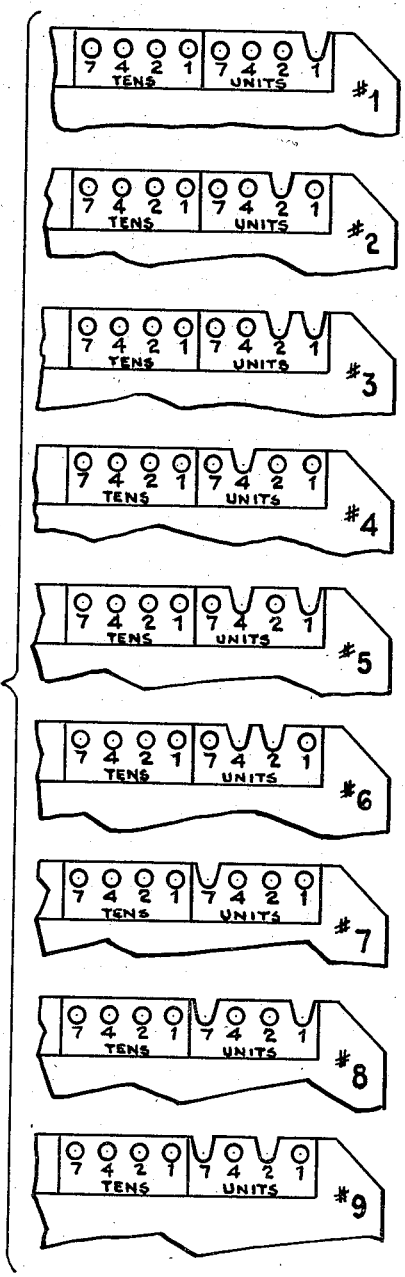
Fig. 20 shows a plurality of cards notched for the combinations to correspond to the numerical sequence from 1 to 9 by the cam as developed in Fig. 19. Similar reference numerals refer to similar parts throughout the entire specification.

The punch operating cams, which for convenience are numbered respectively 35, 35a, 35b, 35c, 35d, 35e, and 35f, (Fig. 5), are mounted on the shaft 12. All of these cams a to f are freely mounted on the shaft 12. The cam 35 which is used for slotting the numerals 1 to 9 is fixedly secured to the shaft and rotates with it. The periphery of each of these cams is provided with a plurality of raised cam surfaces in numerical sequence, as clearly seen in Fig. 19. These cam surfaces, as explained in the preamble, are to actuate punches to notch the cards, not with the numerals 1, 2, 3, 4, 5, 6, 7, 8, and 9, but to notch them in combinations of such numbers shown in Fig. 20, which portrays a plurality of fragmentary views of the cards as they will be numbered from 1 to 9. The top card will be notched by the punch 26 engaged by the cam surface 70 as the cam 35 is rotated, which will result in notching the card as shown in Fig. 20. For notching number 2 the cam surface 71 is located out of line with the raised surface 70 but in line with numeral 2 on the card. For notching numeral 3 the cam surface is formed as shown at 72 and is of a width sufficient to register with both levers which notched the cards 1 and 2. Number 4 is notched by means of a cam surface 73 which is out of register with the cam surfaces 70, 71 and 72, but in position to engage the punch which will notch the card at numeral 4. To notch the card for 5, I employ numerals 4 and 1 so that the cam surface 74 is located in line with cam surface 73 while cam surface 74' is located in line with the cam surface 70, thus the card will be notched with numerals 1 and 4 making a total of 5. Numeral 6 is formed by the combination of 4 and 2 and a solid cam surface 75 is provided, one-half of which is in line with the raised surface 73, the other half is in line with the cam surface 71. The card for numeral 7 is notched by cam surface 76 which is located at the extreme left-hand side of the developed cam shown in Fig. 19 and in line with numeral 7. Numeral 8 is formed by notching the cards 7 and 1 and in this instance the cam surface 77 is formed in line with cam surface 76 while cam surface 77' is located in line with cam surface 70. Numeral 9 is formed by 7 and 2 and the cam surface 78 is placed in line with cam surface 76 and the cam surface 78' is placed in line with cam surface 71. It should be understood that though I am only describing the formation of the cam surfaces on the periphery of the cam 35, that the other cams $a$ to $f$ respectively, are all duplicates so far as the cam surfaces are concerned.

The rotation of the drive shaft 12 will carry with it the punch operating cam 35 inasmuch as it is fixedly secured thereto. The rotation of this cam brings its cam surfaces which have just been described and corresponding in combination to the numbers 1 to 9 inclusive, in line to contact with the raised portion 25a of the levers 25.

The revolution of the cam 35 carries with it a segment gear tooth portion 36 which is adapted to mesh with a gear 37 which is mounted for free rotation on a shaft 38 so that when it engages the tooth portion 36 it will move the gear 37 on the shaft 38 through a predetermined arc. The gear 37 is in mesh with a gear 39 which is fixedly secured to one side of the series (in the preferred embodiment there are five) of punch operating cams 35a to 35f inclusive, which as described, are mounted for free rotation on the shaft 12. This movement of the gear 37 and in turn the gear 39 will turn the punch operating cam, with the raised portions for its sequence of numbers, in proper relation to its corresponding lever 25.

At the opposite side from the gear 39 on each cam 35a to 35f inclusive, is a segmental gear toothed portion, similar to the gear toothed portion 36 so that when cam 35a finishes its punching sequence of numbers, it will turn gear 42 and rotate the gear toothed portion similar to the one just described for cam 35.

In order to overcome the possibility of the vibration produced by the operation of the machine from turning the cams 35a to 35f on the shaft and thus bring in line an undesired number to be notched, the hubs of the gears 37 and 42 are slightly serrated as shown at 43a in Figs. 12 and 16. A collar 44 is splined on the shaft 38 and is provided with a slight projection 44a which is fitted to and coincides with the serrations 43a on the hub 43. The collar 44 is pressed into the serrations 43a by a spring 45 which has just sufficient tension to locate the gears 37 and 42 and keep them from turning on the shaft due to any vibration produced by the operation of the machine. A collar 45a is fixedly secured to the shaft, by means of a set screw so that the tension of the spring 45 may be regulated to the proper degree.

The end of the shaft 38 extends beyond the side frame 1 as clearly seen in Fig. 16. On this extension I mount a handle 65 by means of which shaft 38 can be manually revolved. This permits the resetting of the punch operating cam 35, a spring 66 and a collar 67 which is fixedly secured to the shaft 38 on the inside of the side frame 1 is provided to return the shaft and its cooperating parts to their normal positions. By grasping the handle 65 and pulling on it, it is apparent that the hub 43 will be caused to tightly engage the collar 44, so that the gears may be rotated as desired. Obviously, a resetting device may be provided for the numbering and printing mechanism such as is usually provided for such machine. Thus it will be seen that both the numbering and the notching machine mechanisms may be reset when desired.

Operation

The operation of the device is as follows: A batch of cards C is prepared similar to those shown in Figs. 17 or 18 which are to be numbered and then notched to correspond with the number printed thereon. Assuming that the numbering is to start at number 1, the switch 80 which is connected to a suitable source of supply of electric current (not shown) is closed, and this starts the electric motor 1'. A single card C is placed on the belts 8, 8', 8". This may be done either manually or by an automatic feeding machine such as is well known to the trade. The movement of the belts 8, 8', 8" will carry the card C forward until it abuts stop 46 which will hold it against further forward movement and in properly spaced alignment for the numbering mechanism 49 to print the number 1 on the card.

After this is done, the continued rotation of gear 19 will revolve the eccentric 50 and cause it, through the medium of the eccentric rod, to shift the position of the pivoted levers 51 and 54 depressing stops 46 and 53 and moving them downwardly and out of the plane of movement of the card C which will then be carried forward by belts 8, 8', 8" until it is in register with the punches and ready to be notched. By this time the continued rotation of gear 19 will rotate the eccentric and cause it to move the stops 46 and 53 up into the plane of movement of the cards, so that the second card will abut the stop 46 while the first card will abut the stop 53 which will hold it until the rotation of the cam 35 will bring into engagement the raised surface 70 on said cam, with the raised portion 25a of the punch carrying lever 25. This will press the punch 26 downwardly and cause it to notch the card for numeral 1 as shown at the top of Fig. 20 and as shown at the right-hand side of the cards illustrated in Figs. 17 and 18. At the same time the numbering machine will be printing the numeral 2 on the following card. Further rotation of the eccentric 50 will depress both stops permitting the card which has been notched to move forward and be discharged in a suitable container (not shown) while the card which has been held by stop 46 will have been numbered is moved forward to abut stop 53 and be notched by adjoining punch carrying lever. The raised cam surface 71 actuating it and driving the punch down through the die blocks and causing it to notch the card.

This operation is repeated until the cards have been notched up to numeral 10, when the tooth portion 36 will move the position of cam 35a so as to bring its raised surface 70 in position to depress its registering punch and notch the card for numeral 1 in the division for tens. Obviously, this operation will be continuously repeated until the cards have been numbered up to the largest combination printed on the cards. As shown in Figs. 17 and 18 a card is shown which has been numbered 12788. An examination of the notched card shows that the notches in the units and tens have been 7 and 1 for 8, in the hundreds number 7 alone has been notched. In the thousands number 2 only has been notched. In the tens of thousands number 1 has been notched. As hereinbefore explained this same notching can take place in a card formed as shown in Fig. 18, the only difference being that in this instance the notching is entirely within the edge of the card and until it has been cut off as shown in Fig. 17 it cannot be used for sorting.

It should be understood that the stops 46 and 53 are in timed relation, through the gear train 16, 17, 18 and 19 with the printing and notching mechanism gear train 13, 14 and 15.

As the card C is moving forward to the stop 53 the shaft 12 is rotating in timed relation to bring the proper one of the cammed surfaces on the periphery of the cams into alignment for the punching operation.

Similarly and in timed relation three gear trains 16, 18, 21 and 22 and cam shaft 23 are rotating so that the punch lever 25 will be lowered and caused to notch the card. At the lowest point of movement of lever 25, stops 46 and 53 will have reached their highest point of movement and continued rotation of the cam shaft 23 will bring the cam 24 around causing it to raise the lever 25, carrying the punch 26 into position to notch the card C. As lever 25 is raised, portion 25a strikes cammed surface 70 to 78 as the case may be, and continued rotation of cam 24 to raise lever 25 exerts a pressure at these points to force the forward end of the lever 25 downwardly carrying punch 26 down thus causing the punch to notch the card C. In this operation spring 31 of lever 25 flexes to allow the cam 24 to continue its rotation. As soon as cam 24 passes its top center and is on its downward movement spring 28 returns the lever 25 and punch 26 to normal position.

While these operations are going on from numbers 1 to 9 the segmental tooth portion 36 is being carried around by cam 35 until it is ready to mesh with gear 37, at which time in turning gear 37, it will through gears 37 and 39 move cam 35a to bring cam surface 70 in alignment for punching its combination of numbers from 1 to 9. This operation is repeated for each higher unit sequence of numbers.

After the card C has been slotted and the stop 53 depressed, the belts 8, 8', 8" carry the card forward to the end of the belt line where it may be dropped into a card stacking device of any well known make (not shown) with the lowest number always on the bottom of such stack so that when the stack is reversed the low number will be on top.

Having described my invention what I regard as new and desire to secure by Letters Patent is:

1. In an automatic card sequence numbering and notching machine, one or more belts adapted to carry cards, stops to locate the cards on said belts in predetermined spaced positions one in juxtaposition to the numbering and another in juxtaposition to the notching mechanism for simultaneously numbering and notching spaced cards, means to actuate said stops, a plurality of cams having raised surfaces on their periphery, a plurality of floating punch carrying levers operated in cooperation with said cam surfaces to notch the cards in numeral combinations, a plurality of readily detachable punches, each carried by one of said levers, and gearing means for operating the sequence numbering machine and the sequence punching mechanism simultaneously at predetermined intervals in timed relation to the operation of said stops, said numbering machine and punching mechanism in arrangement whereby the card will be punched and printed with the same serial number.

2. In an automatic card sequence numbering and notching machine, one or more belts adapted to carry cards, stops to locate the cards on said belts in predetermined spaced positions one in juxtaposition to the numbering and another in juxtaposition to the notching mechanism for simultaneously numbering and notching, means to actuate said stops, a plurality of cams having raised surfaces on their periphery, a plurality of resilient floating punch carrying levers, mounted for vertical movement, operated in cooperation with said cam surfaces to notch the cards in numerical combinations, a plurality of punches each carried by one of said levers, and gear trains in timed relation with each other for operating the numbering machine and the punching mechanism at predetermined intervals, said numbering machine and punching mechanism in arrangement whereby the card will be punched and printed with the same serial number.

3. In an automatic card sequence numbering and notching machine, means for feeding cards, stops to locate the cards in predetermined spaced positions one in juxtaposition to the numbering and another in juxtaposition to the notching mechanism for numbering and notching, means to actuate said stops, a plurality of cams having raised surfaces on their periphery, a plurality of floating punch carrying levers operated in cooperation with said cam surfaces to notch the cards in numerical combinations, means to guide said levers vertically, a plurality of punches, each actuated by one of said levers, means to guide said punches, and means for operating the numbering machine and the punching mechanism in timed relationship at predetermined intervals, said numbering machine and punching mechanism in arrangement whereby the card will be punched and printed with the same serial number.

4. In an automatic card sequence numbering and notching machine, means adapted to feed cards, releasable stops to locate the cards in predetermined spaced positions one in juxtaposition to the numbering and another in juxtaposition to the notching mechanism for numbering and notching, means to actuate said stops, a plurality of cams having raised surfaces on their periphery, a plurality of floating punch carrying levers, operated in cooperation with said cam surfaces to notch the cards in numerical combinations, a plurality of punches each actuated by one of said levers, and common driving means for operating the numbering machine and the punching mechanism in timed relationship at predetermined intervals, said numbering machine and punching mechanism in arrangement whereby the card will be punched and printed with the same serial number.

5. In an automatic card sequence numbering and notching machine, means adapted to feed cards, stops to locate the cards in predetermined spaced positions one in juxtaposition to the numbering and another in juxtaposition to the notching mechanism for numbering and notching, means to actuate said stops, a plurality of cams, punches operated in cooperation with said cams to notch the cards in numerical combinations, a resilient lever carrying each of said punches, means to guide said levers vertically, die blocks for said punches, and means in timed relation with each other for operating the numbering machine and the punching mechanism upon certain cards at predetermined intervals, said numbering machine and punching mechanism in arrangement whereby the card will be punched and printed with the same serial number.

6. In an automatic card sequence notching machine having a plurality of punches to notch said cards, a plurality of cams each of which has a plurality of dissimilarly arranged raised surfaces formed on its periphery, a cam shaft on which all of said cams except one are mounted for free rotation, one cam being fixedly secured to said shaft, means to rotate the fixed cam continuously and the remaining cams at predetermined intervals through predetermined arcs, means to cause the movement of said cams to cooperate with predetermined punches which notch said cards in numerical combinations, and means to operate said punches.

7. In an automatic card sequence numbering and notching machine, a conveyor adapted to carry cards, stops to locate the cards on said conveyor in proper spaced positions one in juxtaposition to the numbering and another in juxtaposition to the notching mechanism for numbering and notching, means to actuate said stops simultaneously, a plurality of cams each having differently arranged raised surfaces in numerical combination, a plurality of floating punch carrying levers, each operated in cooperation with the raised surfaces on said cams, a plurality of punches carried by said levers, means for actuating said punches, and means in timed relation with each other for operating said stop actuating means, said numbering mechanism and said cams, said numbering machine and punching mechanism in arrangement whereby the card will be punched and printed with the same serial number.

8. In an automatic card sequence numbering and notching machine, a conveyor adapted to carry cards, stops to locate the cards on said conveyor in proper spaced positions one in juxtaposition to the numbering and another in juxtaposition to the notching mechanism for numbering and notching, means to actuate said stops, a plurality of cams having differently arranged raised surfaces in numerical combination, a plurality of groups of floating punch carrying levers, punches carried by said levers, means for actuating the punches of each group in cooperation with the raised surfaces on said cams to notch said cards in numerical combinations, and means automatically advancing the settings of the numbering and notching machine to print and punch successive cards serially, said numbering machine and punching mechanism in arrangement whereby the card will be punched and printed with the same serial number.

9. In an automatic card notching machine having a plurality of punches to notch said cards, a plurality of cams, each of which has a plurality of raised surfaces formed on its periphery, a cam shaft on which all of said cams except one are mounted for free rotation, one cam being fixedly secured to said shaft, means to rotate the fixed cam continuously and the remaining cams at predetermined intervals through a predetermined arc, and means to cause the movement of said cams to cooperate with predetermined punches to notch said cards in numerical combinations and means to operate said punches.

10. In an automatic card numbering and notching machine, one or more cams each associated with a group of four punches, raised surfaces dissimilarly arranged on the periphery of each of said cams adapted to cooperate with said punches singly and in groups respectively substantially as described, a lever for each punch, said lever having a raised portion adapted to be contacted by the raised surfaces on said cams, a coil spring secured to one end of each lever which holds the punch normally out of the path of travel of said cards, a flat spring secured to the other end of each lever, a rotatable cam on which said flat springs ride, and means to hold said springs constantly in contact with said rotatable cam.

11. In an automatic machine for sequence numbering and notching cards, a printing device for impressing sequential numbers upon cards successively fed thereto, a punching machine for notching said cards in a sequence conforming to the numbers impressed thereon, means for feeding cards to said printing device and numbering machine successively, means periodically stopping said cards in registry with said printing device and punching machine for a time sufficient to permit completion of the printing and punching operations, said numbering machine and punching mechanism in arrangement whereby the card will be punched and printed with the same serial number and means to reset said numbering device and punching machine after each operation for the printing and punching respectively of successive cards.

12. In an automatic machine for sequentially notching cards, a punching machine for notching said cards in a sequence corresponding to printed numbers thereon, means to drive said punching machine, means for feeding cards to said punching machine, said punching machine including a plurality of punches normally supported above the path of said cards, a lever carrying each of said punches, means providing shifting fulcrums for said levers, and means periodically acting upon said levers to actuate said punches and notch said cards.

13. In an automatic machine for sequentially notching cards, a punching machine for notching said cards in a sequence corresponding to printed numbers thereon, means to drive said punching machine, means for feeding cards to said punching machine, said punching machine including a plurality of punches normally supported above the path of said cards, flexible levers carrying said punches, and means acting upon said levers in a predetermined order to operatively position said punches and means acting on said lever to operate said punches and notch said cards.

14. In an automatic machine for sequentially notching cards comprising a punching device for notching said cards in a sequence corresponding to printed numbers thereon, means for feeding cards to said punching device, said punching machine including a plurality of punches normally supported out of the path of said cards, levers carrying said punches, means periodically operating said levers, and cams having different arrangements of projections on their peripheries selectively interposed in the paths of said levers to serve as fulcrums during the operation of said punches to notch said cards.

THOMAS COLEMAN ANDREWS.